March 1, 1932.  R. C. ASHBY  1,847,744
VELOCIPEDE
Filed Aug. 1, 1930
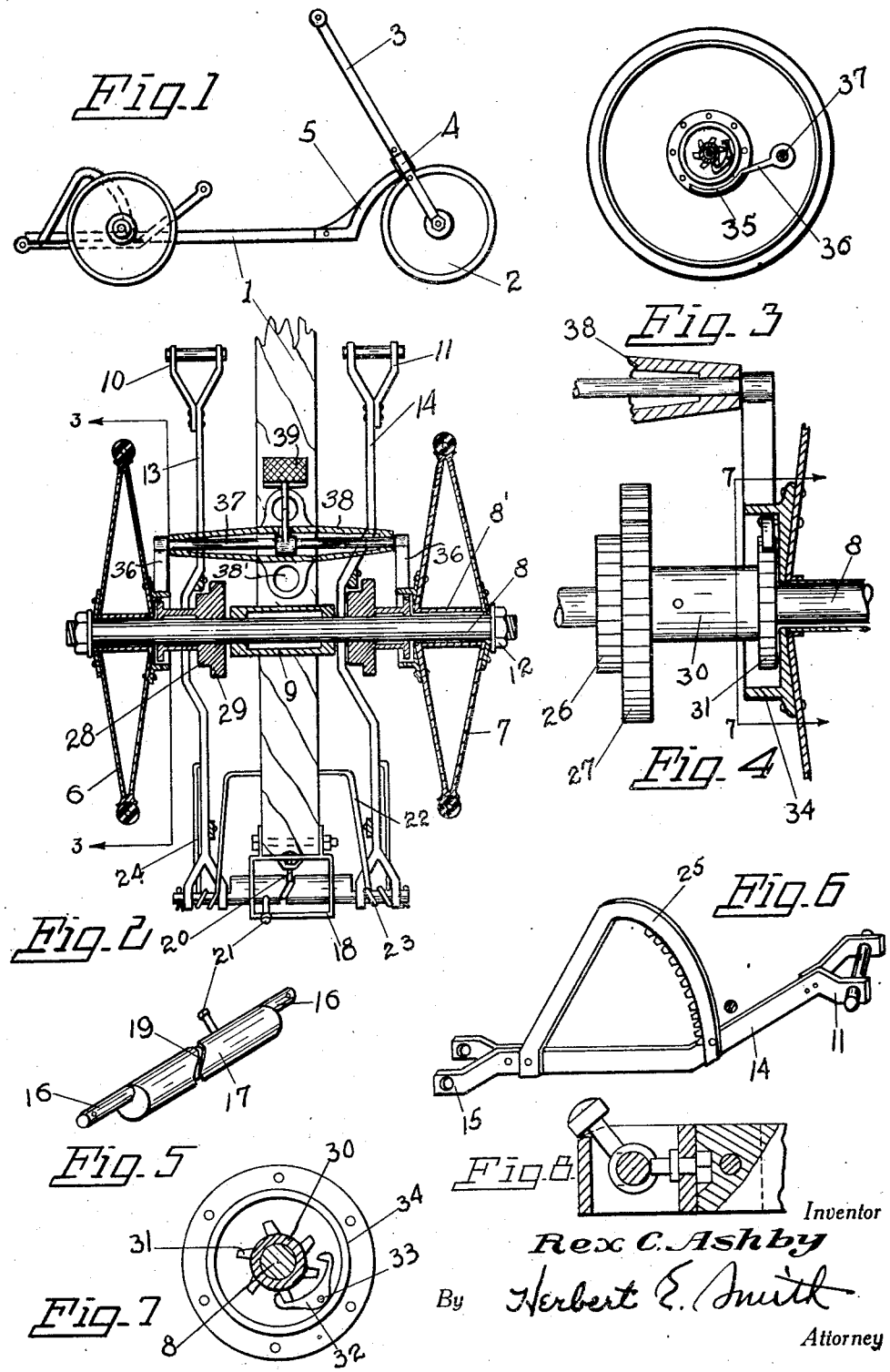
Inventor
Rex C. Ashby
By Herbert E. Smith
Attorney Patented Mar. 1, 1932

1,847,744

UNITED STATES PATENT OFFICE

REX C. ASHBY, OF HOVER, WASHINGTON

VELOCIPEDE

Application filed August 1, 1930. Serial No. 472,234.

My present invention relates to improvements in velocipedes of the polycycle propulsion, rack and gear, or pinion, pedal operated type, embodying also a change speed gearing. The velocipede is of the "scooter" type, that is, the child stands on the pedals and by action of his legs operates rack levers to turn the pair of drive wheels, or the child may stand upon a foot-board of the velocipede with one foot while the other foot is employed to propel the appliance by turning one wheel as a drive wheel.

The invention consists in certain novel combinations and arrangments of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a view in side elevation of the velocipede embodying my invention. Figure 2 is an enlarged, horizontal sectional view of the propulsion mechanism. Figure 3 is a sectional view at line 3—3 of Figure 2. Figure 4 is an enlarged detail sectional view showing a driving clutch, stepped pinions, and other parts. Figure 5 is a perspective view of the shifting cam or eccentric for the change speed device. Figure 6 is a perspective view of one of the pedals or rack levers. Figure 7 is an enlarged sectional view of a drive clutch at line 7—7 of Figure 4. Figure 8 is a sectional detail view at the rear end of the velocipede.

In carrying out my invention I employ the usual foot board 1, the front steering wheel 2 with its post 3 journaled in the bearing sleeve 4 at the front of the arch 5 at the front end of the foot board.

Two spaced drive wheels 6 and 7, preferably of the disk type are loosely journaled on the axle 8, the hubs 8' of the wheels being loose on the journals at the ends of the axle. The axle is disposed transversely of the foot-board and secured thereto by means of an attaching block 9.

The foot pedals 10 and 11 are located between the pair of wheels, and retaining nuts 12 at the ends of the journals of the axle hold the wheels on their journals.

The pedals are located forward of the wheels, at the front ends of rack levers 13 and 14, disposed at opposite sides of the foot-board and between the foot board and the wheels. At their rear ends, the rack levers have forked bearing heads 15 which are pivoted on a pair of eccentric journals, or reduced ends 16 of a cam shaft 17.

The cam shaft is disposed transversely of the velocipede and journaled in bearings in a supporting frame 18 secured at the rear end of the foot board. The cam shaft, at its approximate center, has an annular or circumferential groove 19, of cam shape, that is at all times in engagement with a cam pin 20 fixed to and projecting rearwardly from the rear end of the frame 18. A cam lever 21 is carried by the cam shaft, and it will be apparent that the operator of the vehicle may, by his foot, either push or pull the lever 21 to rock the cam shaft. This rocking movement of the cam shaft, due to the co-action of the cam groove and the cam pin, causes longitudinal shifting of the shaft and its journals, and consequently the rack levers are simultaneously shifted to the right or left. The rack levers are shifted for the purpose of changing the speed of the driving or propulsion mechanism, from high speed to low speed, or vice versa, as will be described.

By foot pressure on the pedals the rack levers are depressed to swing on their journals, and this depression of the levers is against the tension of a spring that returns or lifts the levers to upper position, after a down stroke or working stroke of the levers.

The spring action is accomplished by the use of a U-shaped, spring yoke 22 located beneath and bearing against the under face of the foot board, and this yoke has two coils 23 on the journals 16 and between the tines of the forks of the levers. Spring arms 24 extend forward from the coils and have their free ends under the levers, for exerting their tension on and lifting the levers.

Each lever is fashioned with an arcuate rack 25 rigidly connected therewith and the respective racks co-act with the stepped pinions 26 and 27 and 28 and 29, 26 and 28 for high speed and 27 and 29 for low speed. It will be noted that the smaller pinions are both located at the same (left) side of the larger pinions in order that the levers may simultaneously be shifted from the small high speed pinions to the larger low speed pinions.

Each set of pinions is rigid with a bearing sleeve 30 that is journaled on the axle 8 and each sleeve is fashioned with a clutch wheel or gear wheel 31. The wheel forms part of an automatic driving clutch that includes a double pawl 32 pivoted at 33 in the drum 34, which drum is firmly secured to the drive wheel, one of the drums being attached to each wheel.

These clutches drive the velocipede in a forward direction when the clutches are engaged as in Figure 7, but the double pawls 32 act as escapements when the wheels 6 and 7 turn anti-clockwise, and permit the velocipede to be "backed" without interference of the clutches. The clutches also provide for a differential drive between the two rack levers, so that either one, or both of the levers may be used to propel the velocipede.

The exterior faces of these drums are also used as frictional brake members, and for this purpose I utilize a brake shoe 35 for contact with each drum. The brake shoe is fashioned at the free end of a brake lever or arm 36 rigidly secured at the end of a brake shaft 37, and the shaft, which is journaled in a bearing sleeve 38 may be turned or rocked by foot pressure on the brake lever 39.

The bearing sleeve 38 is rigidly secured at 38' Figure 2 to the foot board and the shaft, which is journaled in the sleeve, extends transversely of the foot board with the brake arms rigid with the ends of the shaft and alined with the drums.

From the above description taken in connection with my drawings it will be apparent that the velocipede may be propelled with a smooth operation, either at high speed or at low speed, and the brakes may be applied with a reliable and efficient action for insuring safety to the operator of the velocipede.

Having thus fully described my invention, what I claim as new and desire to secure by Letters Patent is:—

1. In a velocipede, the combination with an axle, a wheel journaled thereon and a clutch member carried by the wheel, of a stepped (high and low speed) pinion journaled on the shaft and a complementary clutch member carried thereby, a longitudinally movable eccentric rock shaft and rocking means therefor, and a rack lever pivoted on the eccentric shaft for alternate engagement with parts of the stepped pinion.

2. The combination with an axle, a wheel journaled thereon and a clutch member carried by the wheel, of a stepped pinion journaled on the axle and a complementary clutch member carried thereby, a longitudinally movable rock shaft and a cam device for shifting said rock shaft, an eccentric journal on the shaft, and a rack lever pivoted on the journal, for alternate engagement with parts of the stepped pinion.

3. The combination with an axle, a wheel journaled thereon and a clutch member carried by the wheel, of a stepped pinion journaled on the axle and a complementary clutch member rotatable therewith, a longitudinally movable rock shaft having a cam groove and a cam pin co-acting therewith, an eccentric journal on said shaft, and a rack lever pivoted on the journal for alternate engagement with the parts of the stepped pinion.

4. In a velocipede, the combination with a foot board and an axle secured thereto of wheels journaled on the axle, stepped pinions journaled on the axle and driving connections between the pinions and the wheels, pedal operated rack levers for alternate engagement with parts of said stepped pinions on their working strokes, means for shifting the levers relative to the pinions, and a spring device for lifting said levers on their idle strokes.

In testimony whereof I affix my signature.

REX C. ASHBY.